US005426425A

United States Patent [19]

Conrad et al.

[11] Patent Number: 5,426,425

[45] Date of Patent: Jun. 20, 1995

[54] INTELLIGENT LOCATOR SYSTEM WITH MULTIPLE BITS REPRESENTED IN EACH PULSE

[75] Inventors: Alexander Conrad, Neptune Beach; Charles Bell, Jacksonville, both of Fla.

[73] Assignee: Wescom, Inc., Jacksonville, Fla.

[21] Appl. No.: 957,662

[22] Filed: Oct. 7, 1992

[51] Int. Cl.$^6$ ........................ G08B 5/22; G08B 23/00; H04Q 1/39

[52] U.S. Cl. .......................... 340/825.49; 340/825.44; 340/825.55; 340/573; 379/38

[58] Field of Search ...................... 340/825.49, 825.37, 340/286.07, 306, 994, 996, 573, 825.44, 825.55; 359/124, 143, 142, 154; 379/38, 39, 47, 104; 250/338.1

[56] References Cited

U.S. PATENT DOCUMENTS

| | | | |
|---|---|---|---|
| 3,403,381 | 9/1968 | Haner . | |
| 3,439,320 | 4/1969 | Ward . | |
| 3,478,344 | 11/1969 | Schwitzebel et al. . | |
| 3,492,587 | 1/1970 | Hutton . | |
| 3,696,384 | 10/1972 | Lester . | |
| 3,739,329 | 6/1973 | Lester . | |
| 3,805,265 | 4/1974 | Lester . | |
| 3,972,320 | 8/1976 | Kalman . | |
| 4,151,407 | 4/1979 | McBride et al. . | |
| 4,225,953 | 9/1980 | Simon et al. . | |
| 4,275,385 | 6/1981 | White . | |
| 4,330,870 | 5/1982 | Arends . | |
| 4,601,064 | 7/1986 | Shipley . | |
| 4,644,524 | 2/1987 | Emery . | |
| 4,769,643 | 9/1988 | Sogame . | |
| 4,924,211 | 5/1990 | Davies | 340/825.49 |
| 4,952,913 | 8/1990 | Pauley et al. . | |
| 4,990,892 | 2/1991 | Guest et al. . | |
| 4,998,095 | 3/1991 | Shields | 340/825.49 |
| 5,062,151 | 10/1991 | Shipley . | |
| 5,073,940 | 12/1991 | Zinser et al. | 381/47 |
| 5,115,224 | 5/1992 | Kostusiak et al. . | |
| 5,218,344 | 6/1993 | Ricketts | 340/573 |
| 5,363,425 | 11/1994 | Mufti et al. | 379/38 |

FOREIGN PATENT DOCUMENTS

| | | |
|---|---|---|
| 3210002 | 9/1993 | Germany . |
| 1399508 | 7/1975 | United Kingdom . |

OTHER PUBLICATIONS

IEEE, IEEE Standard Dictionary, on "burst" (Third Edition), 1984.

*Primary Examiner*—Donald J. Yusko
*Assistant Examiner*—David Jung
*Attorney, Agent, or Firm*—Clifford A. Poff

[57] ABSTRACT

A locating and monitoring system includes transmitters worn by a person, animal, or equipment to transmit an unique identification code while moving about a facility. The code is transmitted by pulse bursts at diverse times during predetermined time intervals to prevent synchronization with resident signals in the facility. Receivers in the walls or ceilings of the facility respond to the infrared radiation of the pulse bursts and validate the identification code by a checksum of the code through a comparison with a checksum transmitted with the code. The receivers deliver validated codes to arbitrators and receive back signals indicative of the level of an individual assigned to a class wearing the transmitters. Signals from the receivers are received by arbitrators which forward the codes to a CPU for recording start and stop events indicative of movement by transmitters into and out of the reception range of the various receivers.

13 Claims, 13 Drawing Sheets

INTELLIGENT LOCATOR SYSTEM WITH MULTIPLE BITS REPRESENTED IN EACH PULSE

BACKGROUND OF THE INVENTION

1. Field of the Invention:

The present invention relates generally to an electronic locating and annunciating system for a facility and, more particularly, to a system which can continuously operate to maintain a registry of the locations in the facility of individuals and equipment; and store and generate reports of a real time record of movement from location to location of individuals and equipment in the facility.

2. Description of the Prior Art:

The need to maintain an up-to-date registry of the location of the personnel and equipment in a facility such as a building is oftentimes required to allow efficient operation. While the present invention is not so limited, an intelligent locator system is needed in a hospital setting, for example, to quickly locate operating personnel or emergency equipment at critical times. The ability to review accurate records of movement of personnel and equipment over time greatly enhances the ability of management to plan and maximize the utilization of resources, and allow a detailed study of events after an incident. One of the simplest methods for locating personnel within a facility involves a network of loudspeakers and phones or other response equipment. Such a network does not allow for locating equipment, only personnel. Also, broadcasting an announcement throughout the entire facility is distracting to all and requires an active response by the person being located. Furthermore, it is impractical with such network to maintain an up-to-date register for monitoring the location of personnel. U.S. Pat. Nos. 3,436,320; 3,696,384; and 3,739,329 disclose utilizing ultrasonic transmitters and receivers; however, there are disadvantages because the use of ultrasonics in these systems causes excess battery drain in the transmitters; and the ultrasonic signals pass through walls in a facility resulting in erroneous location indications.

Other prior art systems have been developed utilizing electro-magnetic wave energy in the infrared frequency spectrum for the transmitters and receivers. For example, German Patent No. 32 10 002 discloses a system using infrared light emitters which transmit periodic signals for detection by a receiver that in turn energizes relays to register the presence of a person carrying the infrared emitters. No suggestion is made for preventing signal overlap between two different periodic signals transmitted by emitters carried by two different individuals. Additionally, the infrared emitters operate continuously which degrades battery longevity.

Also disclosed in U.S. Pat. No. 4,275,385 is a personnel locating system which maintains a registry of individuals by tracking their entry and exit from defined areas. Each person carries a portable transmitter, and each transmitter transmits a unique twelve bit binary code word with start, stop and parity bits employing infrared light emitting diodes. Infrared receivers are positioned to allow detection of the binary code word transmitted by the transmitter. However, the receiver can only detect the transmitted code word over a limited range, and only when the receiver is positioned so as to be in the "line of sight" of the transmitter. To overcome this problem, the receivers are positioned in doorways to rooms forming the defined area. When a person carrying a transmitter passes through the doorway, such passage is detected. The system therefore actually tracks the entrance and exit of personnel from the rooms rather than continuously maintaining the locations of the personnel. As a result, this prior art system also suffers from several inherent disadvantages. First, because a receiver only detects the transmitted signal during the brief period of time in which personnel pass through a doorway, any transmission problem occurring during this period of time results in the entry and/or exit of the personnel not be registered. Because a unique multi-bit code word as well as parity and stop/start bits must be transmitted in sequence by a portable transmitter in order to correctly identify the personnel passing through the doorway, any bit error results in an incorrect registry entry. Additionally, the number of receivers required to maintain an accurate registry of personnel increases greatly if a room contains more than one doorway allowing entrance and exit. A still further disadvantage inherent to this system occurs when two or more individuals enter through a doorway simultaneously in close proximity to one another (i.e., within the envelope of the receiver). The receiver cannot differentiate between the transmitted signals. Again, an erroneous registry indication results as no individual is registered as entering and/or exiting through the doorway. Still further, an erroneous registry indication also results when personnel pass within the envelope of the receiver, but do not pass through the doorway. For example, in a hospital setting, personnel walking along a hallway may pass within the envelope of several receivers positioned in the doorways of several rooms, but enter none of the rooms. The system would register such personnel in all of the rooms at the same time. In a hospital setting such false information is actually more detrimental than no information at all.

SUMMARY OF THE PRESENT INVENTION

According to the present invention there is provided a locating and monitoring system installable on the premises of a facility, the system including at least one transmitter means adapted for movement about the facility with a person, with an animal or with equipment to allow identification of such transmitter means at any of diverse sites in the facility, the transmitter means including means for transmitting pulse bursts at diverse times during predetermined time intervals for preventing synchronization with resident signals in the facility, the pulse bursts defining a unique binary identification code, and means responsive to the pulse bursts for establishing the location of the transmitter means in the facility.

Advantageously, a plurality of transmitters and a plurality of receivers form part of the system. The receivers each have a reception range about a premises with an allowable overlap with the reception range of another of such receivers. Each of the receivers is responsive to the pulse bursts to validate the binary identification code and thereby establish presence of the transmitter means within the reception range of a receiver. The receivers are joined to a gathering station for validating outputs from each of the receivers and forming start and stop events. The start events include the identity of the one receiver of the plurality of receivers, the binary identification code of one transmitter of the plurality of the transmitters, and when the pulse bursts of such transmitter was detected by such receiver. The stop events include the identity of the one receiver of the plurality of the receivers, the unique identification code of the one transmitter when loss of reception has occurred within the reception range, and when such loss of reception occurred. The receivers are connected to communicate as a group with a plurality of the gathering stations connected by a serial port to a central computer having a storage medium for storing the start and stop events. In the preferred form of the present invention, the system is issued for tracking the movements of hospital personnel and allied hospital equipment, and interfacing to an existing nurse call hospital system by providing: that each of the plurality of the transmitter means comprises a portable communication badge worn by allied hospital personnel, including nurses, and attached to the hospital equipment; the means for establishing the location including a receiver installed in each patient room to interface with the nurse call hospital system; a receiver installed in each patient room for indicating when the allied hospital personnel wearing one of the badges is in the room, and the class of a number of classes to which the allied hospital personnel belongs; and an interface between the central computer and the nurse call hospital system such that location queries entered at terminals of the hospital system are routed to the central computer.

According to a further aspect of the present invention there is provided a locating and monitoring system installable on the premises of a facility, the system including at least one portable transmitter means adapted for movement about the facility with a person, with an animal or with equipment to allow monitoring of such transmitter means at any of diverse sites in the facility, the transmitter means including means for generating infrared pulse bursts defining a unique binary identification code essentially including an error detection word.

In another aspect of the present invention, the system includes at least one transmitter means adapted for movement about the facility with a person, with an animal or with equipment to allow identification of such transmitter means at any of diverse sites in the facility, the transmitter means including infrared means for generating pulse bursts defining a unique binary identification code according to a pulse position scheme wherein at least two binary bits of the code are represented by one pulse.

In a still further aspect of the system of the present invention includes at least one transmitter means adapted for movement about the facility with a person, with an animal or with equipment to allow identification of such transmitter means at any of diverse sites in the facility, the transmitter means including means for transmitting pulse bursts defining a unique binary identification code, and a plurality of receiver means responsive to the pulse bursts for establishing the location of the transmitter means in the facility, and a gathering station joined to each receiver of the plurality of receivers for validating outputs from each of the plurality of receivers and forming start and stop events, the start events including the identity of the one receiver of the plurality of receivers, the binary identification code of the transmitter, and when the pulse bursts of such transmitter was first detected by such receiver; the stop event including the identity of the one receiver of the plurality of the receivers, the unique identification code of the transmitter when loss of reception has occurred within the reception range, and when such loss of reception occurred.

BRIEF DESCRIPTION OF THE DRAWINGS

Still other objections and advantages of the present invention will become apparent when the following description is read in light of the accompanying drawings in which.

DETAILED DESCRIPTION OF THE PREFERRED EMBODIMENTS

Figure 1:
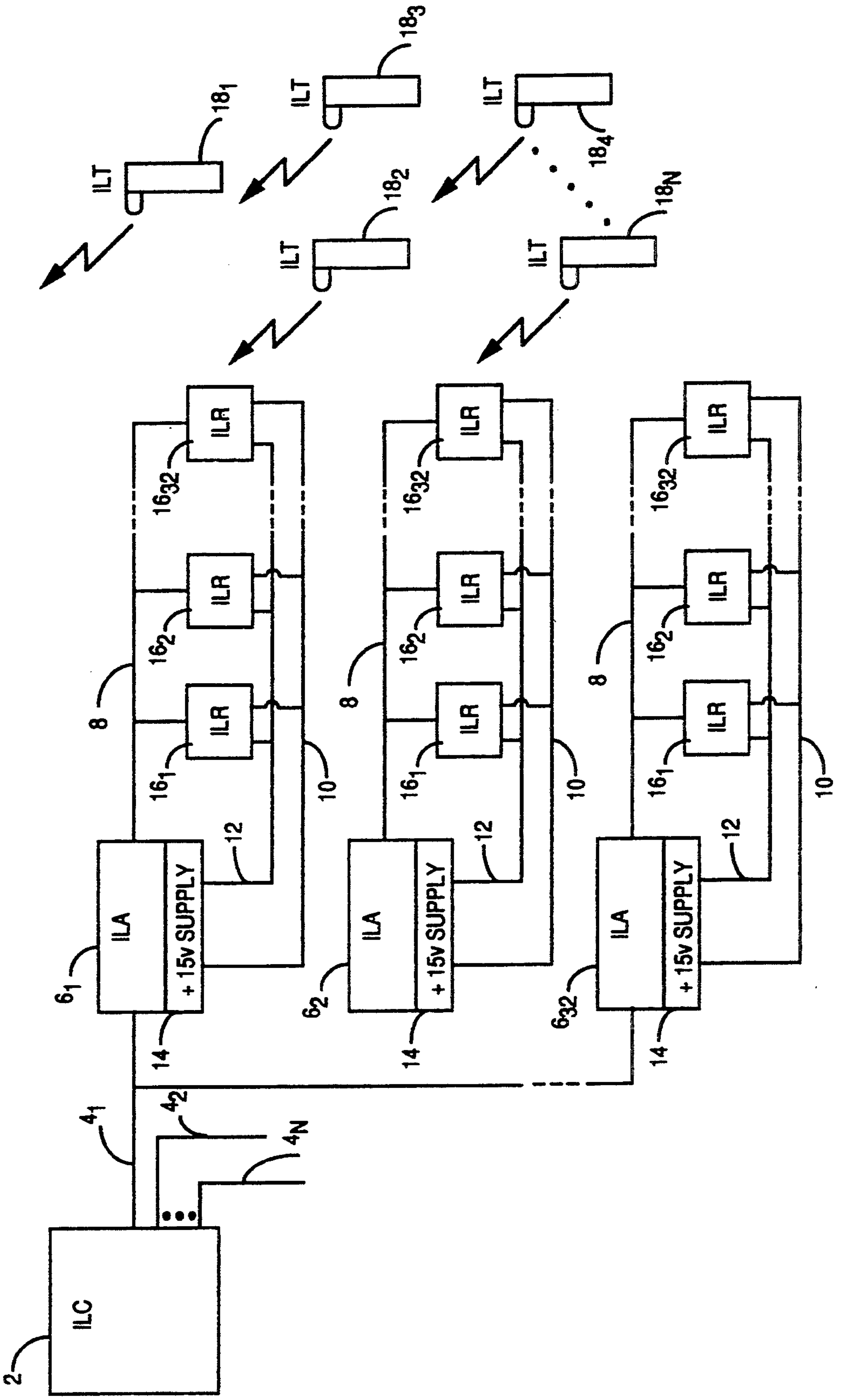
FIG. 1 is a block diagram of the intelligent locator system according to one embodiment of the present invention.

Referring first now to the block diagram of FIG. 1, there is illustrated one form of intelligent locator system according to the present invention which is useful as a stand alone system for tracking and locating persons and equipment in a hospital; tracking and locating persons and/or product and equipment in a factory, warehouse, retail store or other space; keep records of progress of new product through the production process in a factory, and tracking animals in a storage and feeding facility.

The intelligent locator system of FIG. 1 includes a central control computer such as a Personal Computer having a 386 central processor identified for the purpose of disclosure of the present invention as an intelligent locator computer 2 because of interfacing with allied components of the system. A serial data bus 4 supplies commands between a serial port of the computer 2 at least one and up to preferably 32 local gathering stations identified as intelligent locator arbitrators $\mathbf{6}_1$, $\mathbf{6}_2 \ldots \mathbf{6}_{32}$. The computer 2 may also include additional serial ports coupled to data bus lines $\mathbf{4}_1$, $\mathbf{4}_2 \ldots \mathbf{4}_n$ of a plurality of such intelligent locator arbitrators $\mathbf{6}_1$, $\mathbf{6}_2 \ldots \mathbf{6}_{32}$. Communication over serial data bus lines $\mathbf{4}_1$, $\mathbf{4}_2 \ldots \mathbf{4}_n$ is based on, but not restricted to the Electronic Industries Association standard RS-485. Each arbitrator $6_1$, $6_2$ . . . $6_{32}$ communicates by a serial data bus $8_1$, $8_2$ . . . $8_{32}$, with up to 32 intelligent locator receivers $16_1$, $16_2$ . . . $16_{32}$.

The intelligent locator arbitrators $6_1$, $6_2$ . . . $6_{32}$ each includes a +15 DC volt power supply 14 to supply electrical power to the associated arbitrator and line 10 to supply electrical power to intelligent locator receivers $16_1$, $16_2$ . . . $16_{32}$ coupled to the associated intelligent locator arbitrator. A ground line 12 is arranged parallel with line 10 which forms an electrical ground potential common to all of arbitrators and receivers. All the intelligent locator receivers associated with the various intelligent locator arbitrators are responsive to anyone of at least one but preferably a plurality of intelligent locator transmitter badges $18_1$, $18_2$, $18_3$, $18_4$ . . . $18_n$, each of which, as will be described in greater detail hereinafter, transmits an unique bit code when chosen with 20 bits to enable up to 1,048,576 badges uniquely recognizable by the system. More than 20 code bits can be used to allow more than 1,048,876 badges to be uniquely recognized by the system. A bit code greater than 20 bits may be adopted with out departing from the spirit of the present invention.

The intelligent locator badges 18 are constructed in a manner suitable to be worn by persons, animals, and/or equipment and transmit a unique identification code using infrared transmissions. The receivers 16 with infrared detectors are installed at any of various different locations throughout a facility to allow detection of the unique code emitted by any of intelligent locator transmitters 18 within a detection range. While the invention is not so limited, these receivers 16 can be installed in walls, floors, ceilings, structural parts, and special mountings provided in the facility. The functions of intelligent locator arbitrators $6_1$, $6_2$ . . . $6_{32}$ is to process the signals to determine when an unique identification code emitted by the intelligent locator transmitter 18 starts being detected by any intelligent locator receivers $16_1$, $16_2$ . . . $16_{32}$ and when the code stops being detected. The arbitrators transmit signals corresponding to these start and stop events to the computer 2. A maximum of preferably 32 intelligent locator arbitrators 6 may be connected to a serial port of the intelligent locator computer 2 via the RS-485 serial bus 4. This gives rise to the possibility of up to 1024 intelligent locator receivers 16 per intelligent locator computer 2 serial port. The operating software of the intelligent locator computer operates to read into the computer memory the start and stop events from the intelligent locator arbitrator's 6, time stamps the events, and stores the data of the event in a relational database.

A system user will be able to input a request to the intelligent locator computer 2 terminal and/or generate a report of the present location of any person, animal, or equipment which is wearing an intelligent locator transmitter badge 18 including movement of the badge with the person, animal, or equipment over any previous time period.

Figure 2:
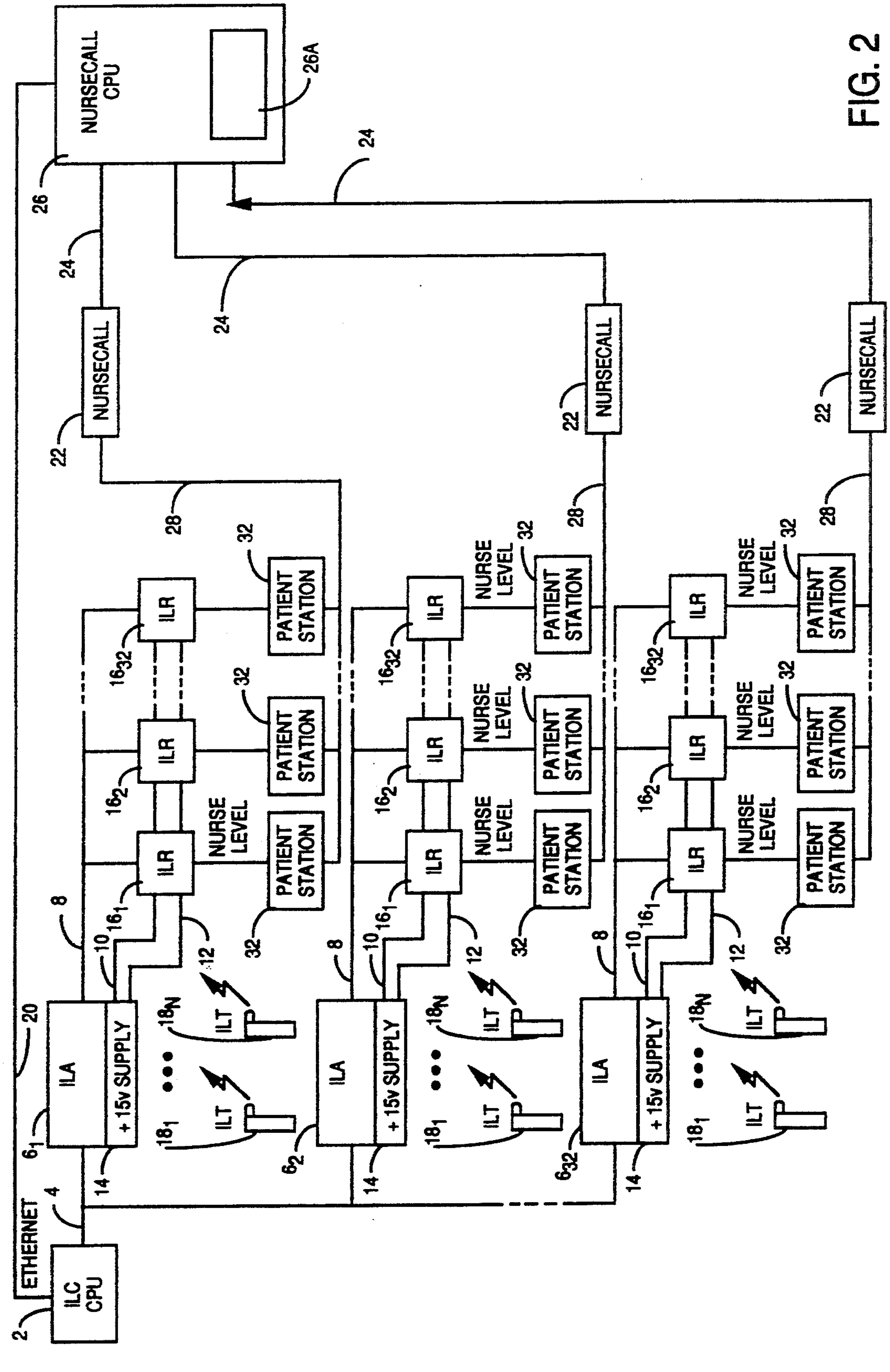
FIG. 2 is a block diagram of the intelligent locator system in a hospital nurse-call system according to a preferred embodiment of the present invention.

Referring now to the block diagram of FIG. 2, there is illustrated, in block form the preferred embodiment of the intelligent locator system for use in a specific application of a computer controlled hospital nurse call system, preferably a Wescom System 3000™. The nurse call system includes a nurse call CPU 26 having an input device 26A such as a key board. The CPU 26 fulfills the function of a central computer controlling the nurse call system that also includes one or more nurse-call central control terminals $22_1$, $22_2$, . . . $22_{32}$ each connected to communicate over a standard RS-232 bus 24 with the nurse call CPU 26. Terminals $22_1$, $22_2$, . . . $22_{32}$ are each connected by a parallel data bus 28 to communicate with patient room stations 32 dispersed about a local area of the facility such as a floor of a hospital. The nurse call CPU 26 is coupled by an ethernet high speed serial data bus 20 using standard tcp/ip protocol with the intelligent locator computer 2. When operating with a nurse-call system, the intelligent locator system of the present invention replaces automatic or manual locators that are normally found with such a system. When nurses wearing the intelligent locator transmitter badges enter a patient's room in response to a call, the intelligent locator system automatically detects their presence and communicates that information to the nurse-call system and thereby eliminates the need for the nurses to manually register their presence. An example of the operation of the system shown in FIG. 2 is that the intelligent locator computer 2 stores information identifying the level of the person or personnel wearing all badges, e.g., RN, LPN, aid, as well as the specific identity of the nurse wearing that badge and transmits the level information back through the intelligent locator arbitrators $6_1$, $6_2$ . . . $6_n$ and through intelligent locator receiver $16_1$, $16_2$ . . . $16_{32}$ to the patient stations 32 which need that level information to determine whether the nurse being detected by the intelligent locator receiver 16 is of the requisite qualification level to respond to the need of the nurse call placed at the patient station.

The nurse-call system operators, at their own nurse-call terminals through the ethernet communication line 20 between the intelligent locator computer cpu 2 and the nurse-call cpu can request information about the current location of any nurse, other personnel or hospital equipment wearing an intelligent locator transmitter badge 18. A detailed description of the construction and operation of intelligent locator arbitrator 6, intelligent locator receiver 16 and intelligent locator transmitters 18 follows.

Figure 3:
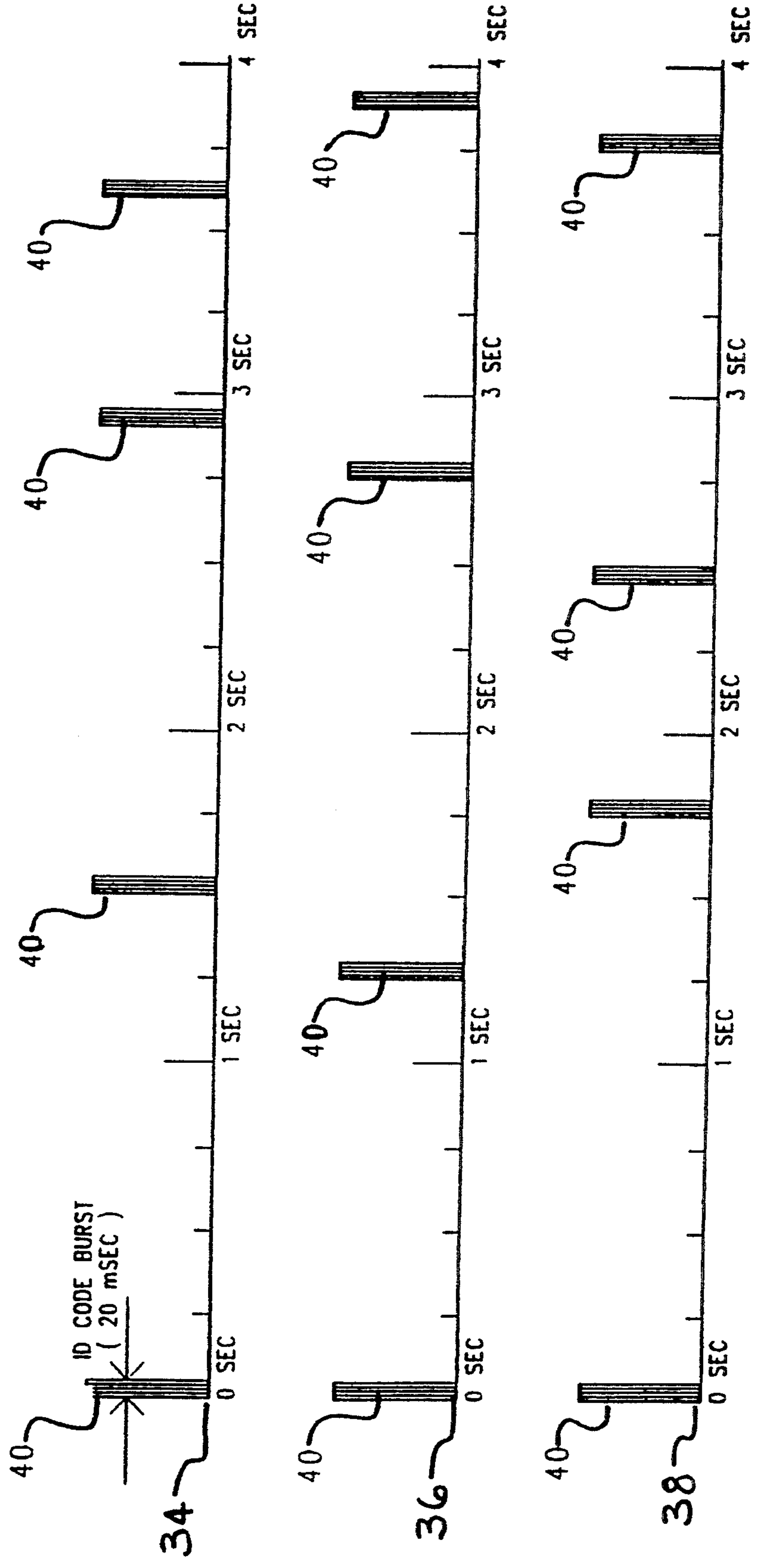
FIG. 3 is a timing diagram showing three simultaneous infrared identification code transmissions.

An important feature of the present invention is the coding for transmission and decoding of received pulse bursts at diverse times during predetermined time intervals to define an unique binary identification code for the operation of the locating and monitoring system. To facilitate an understanding of the underlying principle of the present invention, reference is now made to the diagram of FIG. 3 wherein there is illustrated timing diagrams in graphical form of three simultaneous infrared transmissions by three separate intelligent locator transmitters over a four second period. It is an important and novel feature of the present invention that a pulse burst of 20 milliseconds duration defines a unique binary identification code that is transmitted approximately once a second with its position in time relative to the start of each second determined by an algorithm. As shown in FIG. 3, for illustrative purposes only, when the code bursts 40 of all three badges happen to line up at the same time of 0 second thus interfere with one another as depicted at the far left of FIG. 3, then during the next second all three pulses and any two of the pulses will not simultaneously occur or line up in time because the pulses emitted by their respective transmitters occur in time according to a different code determined by when the pulse transmission occurred during the preceding second. In this way, multiple badges carried into the same room of a facility can be distinguished from one another by their infrared pulse transmissions as detected by the receiver. Moreover, the infrared transmission by only one such transmitter can be uniquely identified from all other infrared pulse transmissions whether from other badge transmitters or sources of infrared pulse transmissions occurring within the facility. In this regard it is to be noted that infrared pulse transmissions may be emitted by equipment or devices carried by persons within the facility. Thus, the present invention is intended to enable unique identification of any given badge with respect to other badges and sources of infrared transmissions. The algorithm for determining when within each second the unique identification code is transmitted by a infrared pulse burst resides in the software of a microcontroller forming part of the intelligent locator transmitter 18. The algorithm functions by accessing through a 20 bit identification code at a rate of 1 bit per second using a current bit value of "0" or "1" to determine whether to transmit a code burst during the first half or the second half of the current second. The algorithm also functions at the same time to step through the 20 bit identification code at a rate of 4 bits at a time during each second and using a current 4 bit part of the code to determine when the pulse bursts are to be transmitted within that first or second half of a second. The time span of a second was chosen arbitrarily and may, for example, comprise a time period 1 and ½ seconds long.

Figure 4:
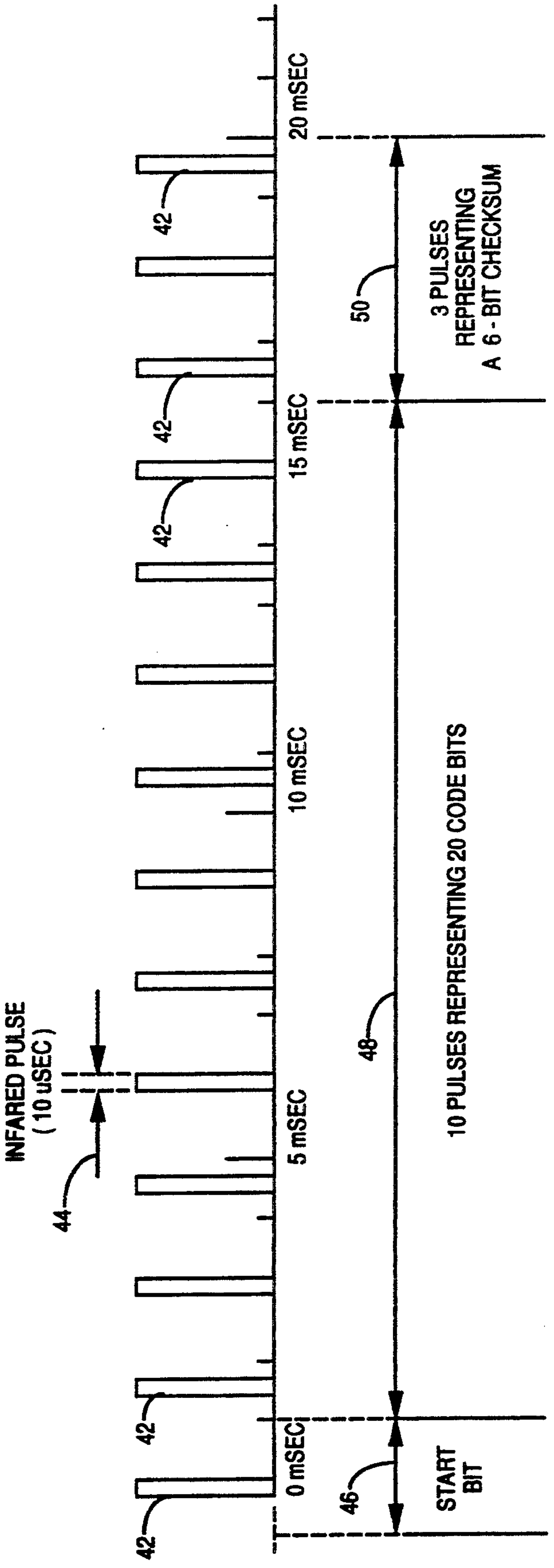
FIG. 4 is one example of timing diagram of bits comprising an identification code burst.

As described in regard to FIG. 3, the pulse bursts occur for a duration of time selected for the purpose of describing the present invention to be 20 milliseconds. In FIG. 4 a 20 millisecond time interval is depicted during which 14 infrared pulses, each identified by reference numeral 42, occur with an approximate 10 microsecond duration which is identified by reference numeral 44. The 20 millisecond burst transmission is made up of 3 components. The first is a start bit interval 46 during which an initial pulse 42 occurs to synchronize the receiver 16 for reading the transmission. The second component of the pulse transmission are 10 pulses occurring during an interval 48 representing a 20 bit code. A third component of the pulse transmission, which also comprises an important novel feature of the present invention, are three pulses 42 representing a 6 bit checksum occurring during an interval 50 and detected and used by a receiver 16 to insure integrity of the received data.

Figure 5:
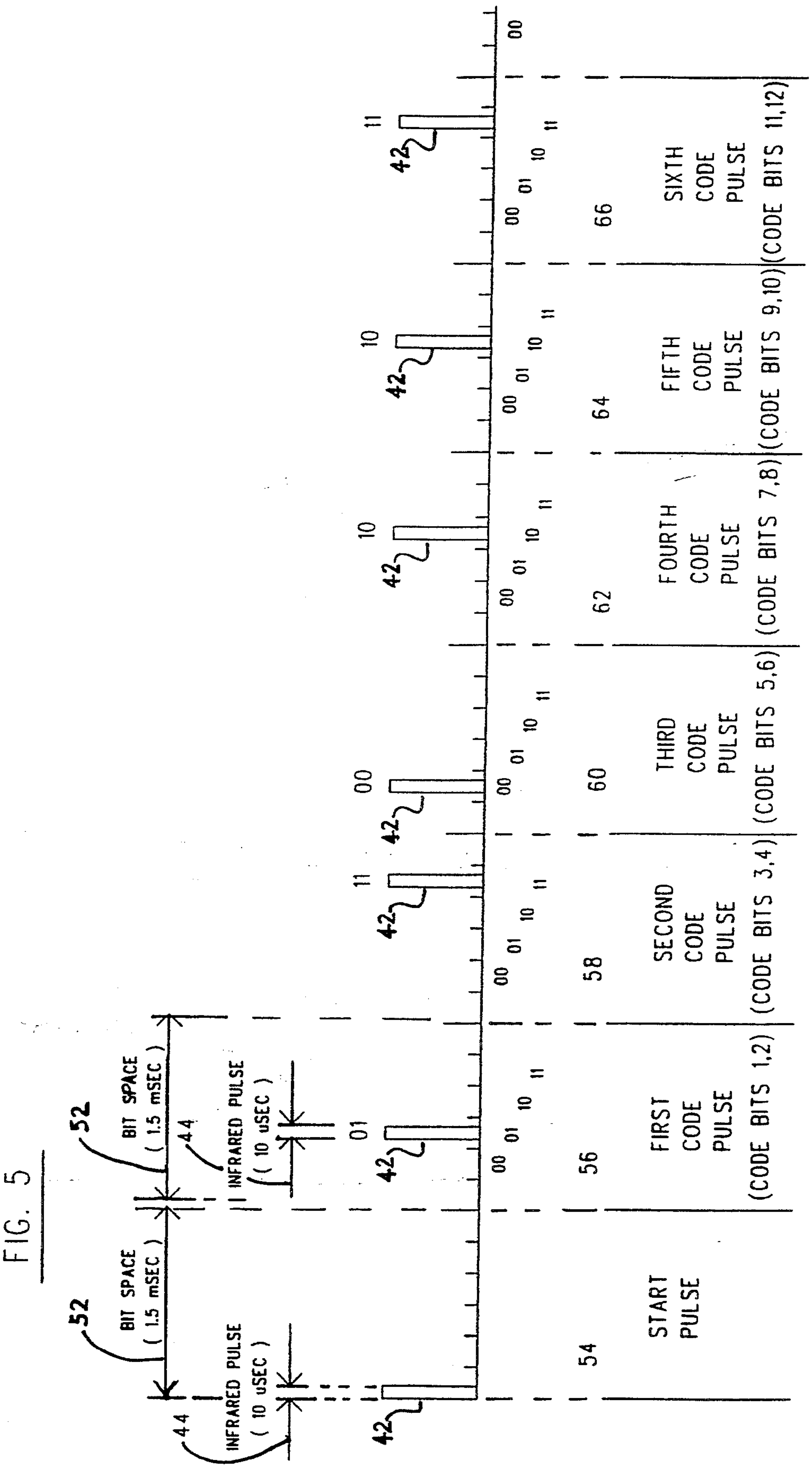
FIG. 5 is a timing diagram showing details of a pulse position scheme according to the present invention.

Referring again to the time interval 48 of FIG. 4, this interval is depicted with greater detail in FIG. 5 wherein the graphical illustration represents a timing diagram of the pulse position scheme used to represent 2 binary data bits by the transmission of 1 infrared pulse transmission 42. It is a further important novel feature of the present invention to provide that each infrared pulse 42 represents 2 binary bits of code which not only reduces the number of necessary infrared pulses to define the code but also offers a material saving to the life of a battery power supply for the transmitter. It is of vital importance to conserve battery power consumed by the operation of the transmitter. Battery drain occurs when the infrared emitters are turned ON for each pulse. This is a significant advance over known prior art systems which used a burst of pulses for each bit with the pulse occurrence being varied in frequency to distinguish "0" from a "1". In FIG. 5 each 10 microsecond duration 44 represents the emission of an infrared pulse 42 that occurs sometime during a 1.5 millisecond bit space 52. The bit space is defined to provide 4 discrete time intervals within which a pulse can occur. When a pulse occurs during the first of the 4 intervals, it represents a 2 binary bit code "00" which is shown to occur during the bit space 60 as a third code pulse. When a pulse occurs during a second of the 4 intervals, it represents a 2 binary bit code "01" which is shown to occur during the bit space 56 as a first code pulse. When a pulse occurs during a third of the 4 intervals, it represents a 2 binary bit code "10" which is shown to occur during the bit space 62 as a fourth code pulse. When a pulse occurs during a fourth of the 4 intervals, it represents a 2 binary bit code "11" which is shown to occur during the bit space 58 as a second code pulse.

As noted above, only 4 intervals of a defined 6 interval bit space are used for the occurrence of a pulse. The first interval occurring before the middle 4 intervals and the sixth interval occurring after the middle 4 intervals enable the circuity of the receiver 16 to distinguish between successively occurring pulses especially where, for example a second code pulse "58" defines a code "11" is followed by a third code pulse 60 defining a code "00".

INTELLIGENT LOCATOR TRANSMITTER 18

Figure 6:
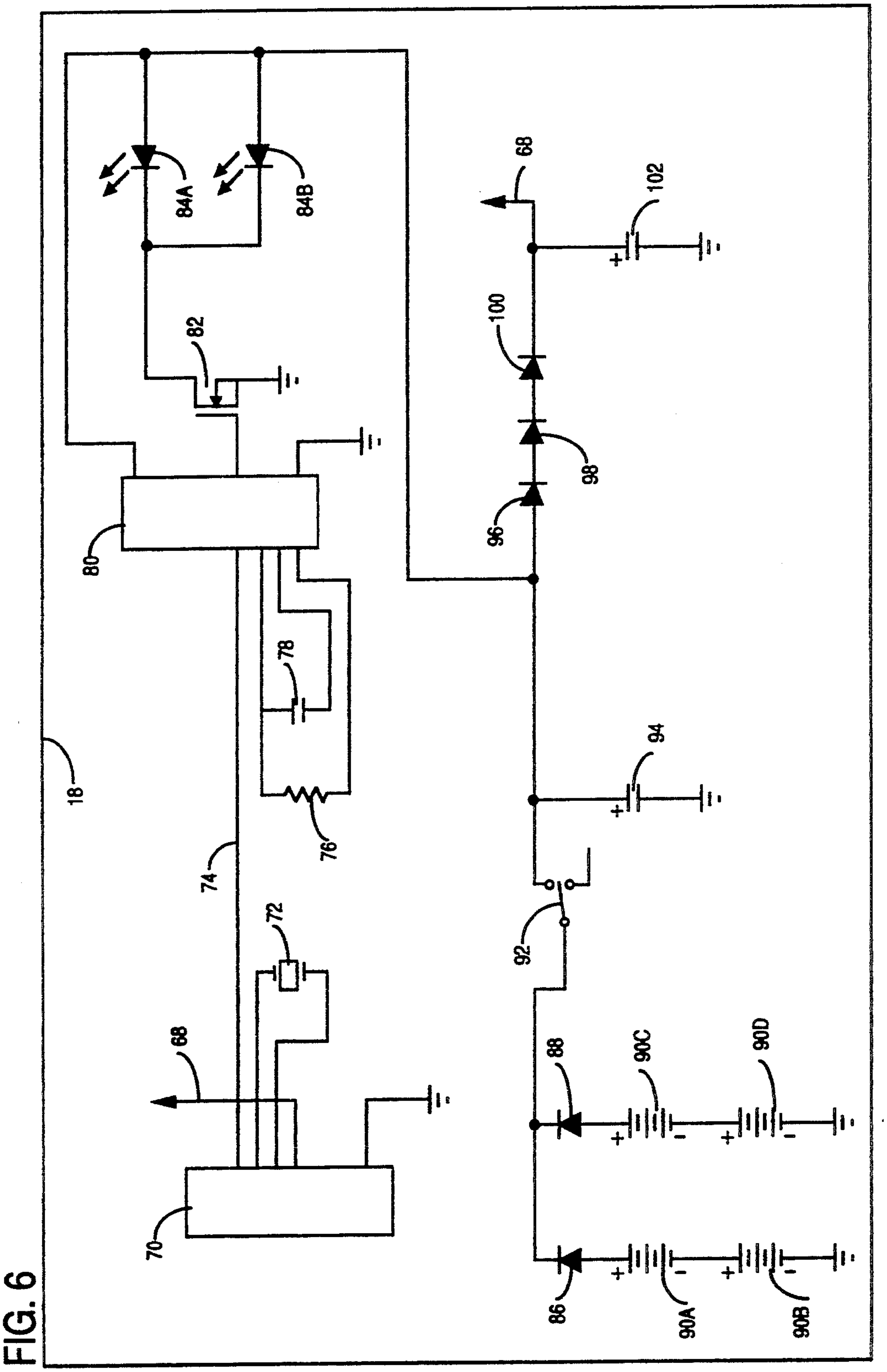
FIG. 6 is a schematic illustration of the circuitry of the intelligent locator transmitter forming part of the systems of FIGS. 1 and 2.

In FIG. 6 schematically illustrated is the circuitry of an intelligent locator transmitter useful in the systems of FIGS. 1 and 2. The transmitter 18 includes a microcontroller 70 comprised of an IC package containing a programmable memory for an operating program whose function is to define an unique 20 bit identification code for identifying the transmitter uniquely among all other transmitters and other sources of possible infrared pulse emissions occurring within the receiving range of the receivers 16. A microcontroller suitable for use in the preferred embodiment of the present invention is a Microchip PIC16C54LP, which is a low voltage CMOS device. The microcontroller operates at a slow speed set externally at, for example, 32 kilohertz, by a quartz crystal 72 which is the minimum speed sufficient to generate identification code pulses and minimize power consumption which is directly related to the speed of operation. A serial bit stream of 125 microseconds wide logic pulses is output on data line 74 to a monostable multivibrator 80 formed by an IC package per se well known in the art to produce an output on line 81 in the form of 10 microsecond pulses for transmission which turns ON a MOSFET transistor 82. Infrared light emitting diodes 84A and 84B are energized when transistor 82 is turned ON. Diodes 84A and 84B, per se well known in the art, are preferably selected to emit bursts of infrared radiation at a wave length preferably selected at 940 nanometers. Resistor 76 and capacitor 78 forms an RC circuit which determines the 10 microsecond pulse width output by multivibrator 80. Coin-sized flat lithium cell batteries 90A, 90B, 90C and 90D supply power for the operation of the intelligent locator 18.

Diodes 86 and 88 are arranged to form rectifiers by their connection between 90A, 90B, 90C and 90D for protecting the circuitry of the transmitter in the event the batteries are installed with their polarity reversed. The transmitter can be turned OFF by operation of switch 92 coupled in power supply line 93. Capacitor 94 stores an electrical charge between pulse emissions which is discharged when the light emitting diodes 84A and 84B are turned ON for emitting high intensity emission pulses. A serial arrangement of diodes 96, 98 and 100 establish a low voltage in line 68 for powering the microcontroller 70. The voltage setting function of diodes 96, 98 and 100 contributes to a reduction of power consumption by reducing the operating voltage supplied to the microcontroller 70. Capacitor 102 coupled between the voltage supply line 68 and ground minimizes noise and other interference to insure reliable operation of the microcontroller 70 by forming a buffer and filter in the voltage supply line 68.

INTELLIGENT LOCATOR RECEIVER 16

Figure 7:
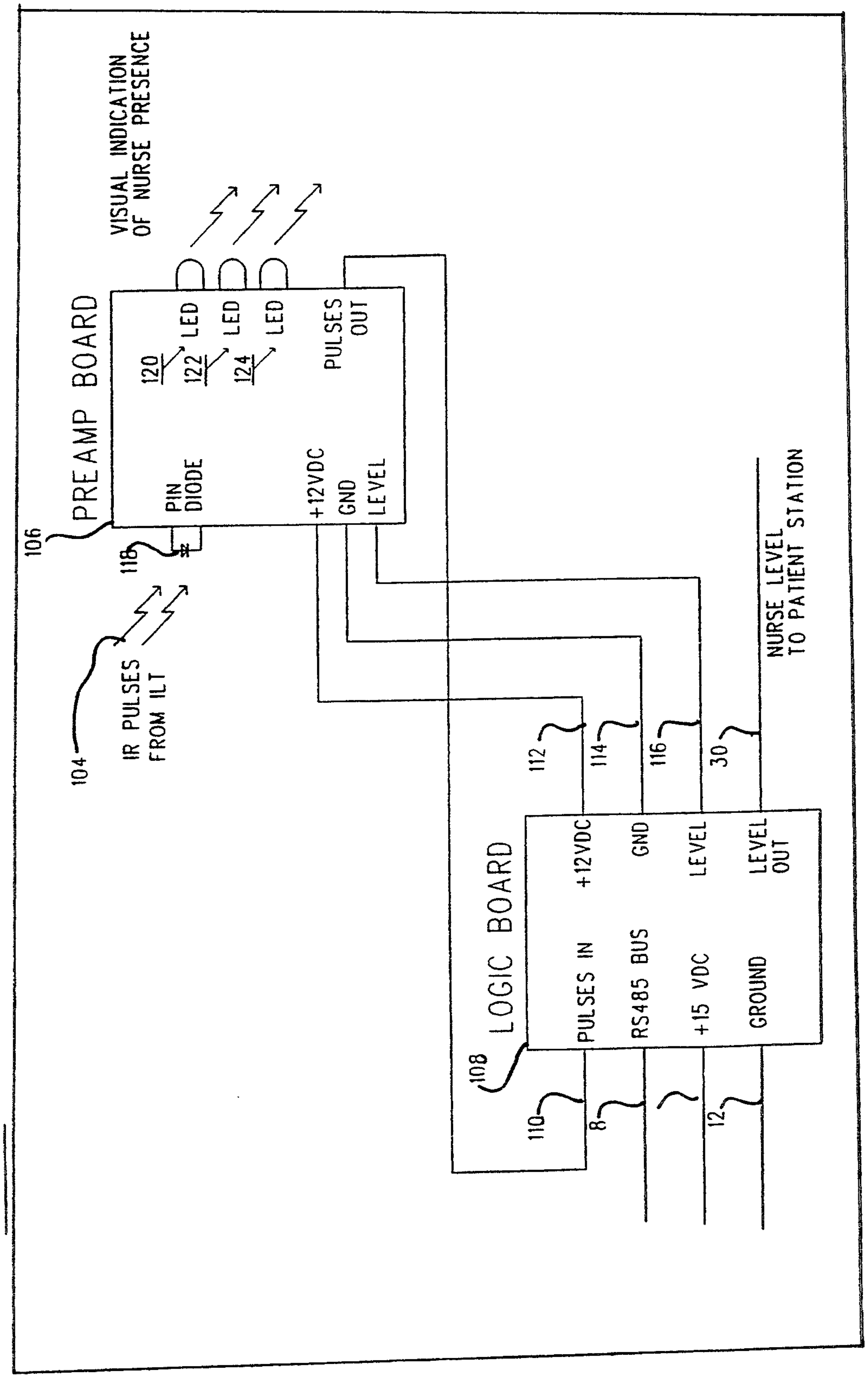
FIG. 7 is a block diagram of the intelligent locator receiver forming part of the systems of FIGS. 1 and 2.
Figure 8:
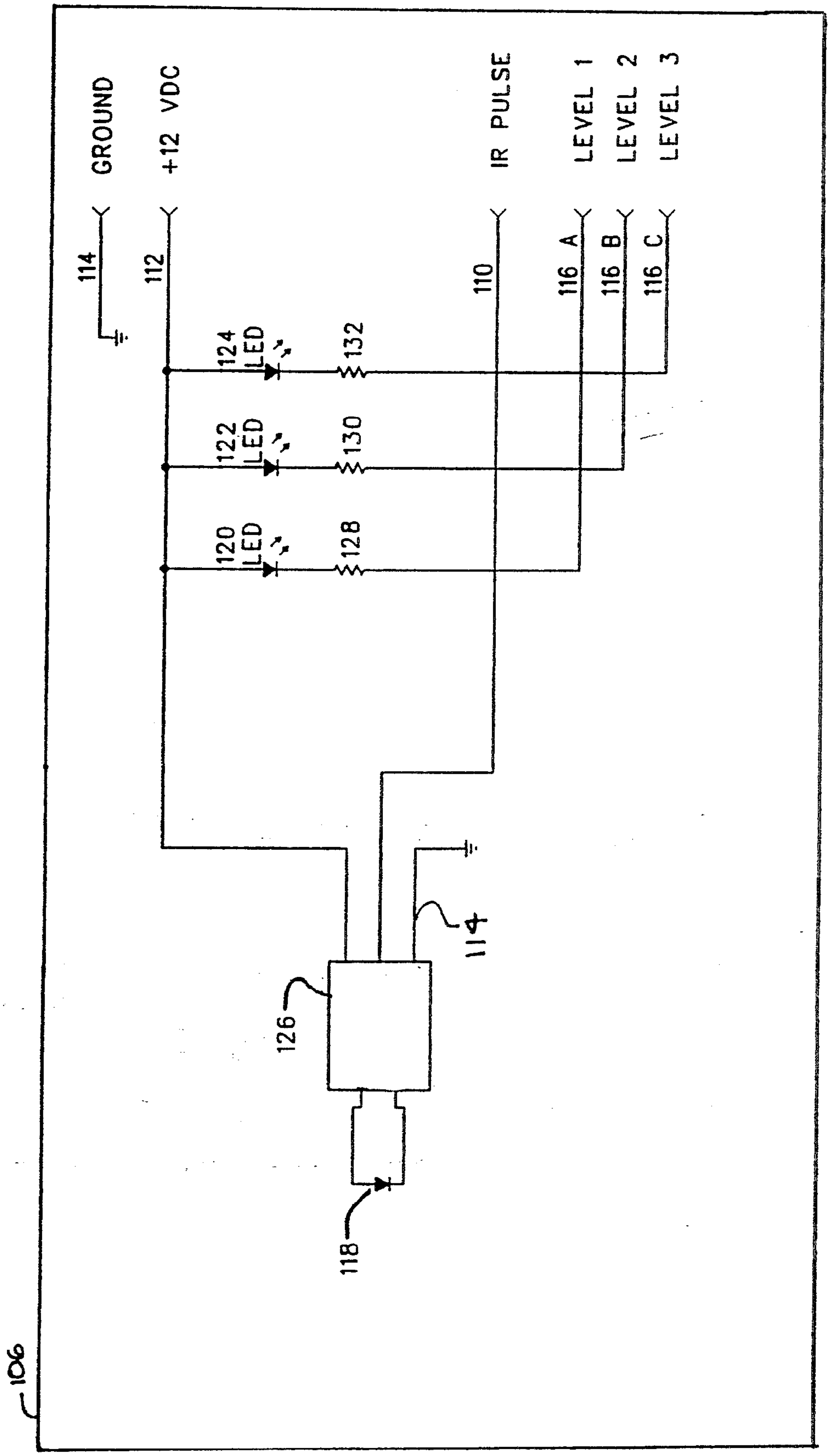
FIG. 8 is a schematic illustration of the circuitry for the infrared preamplifier for the intelligent locator receiver shown in FIG. 7.
Figure 9:
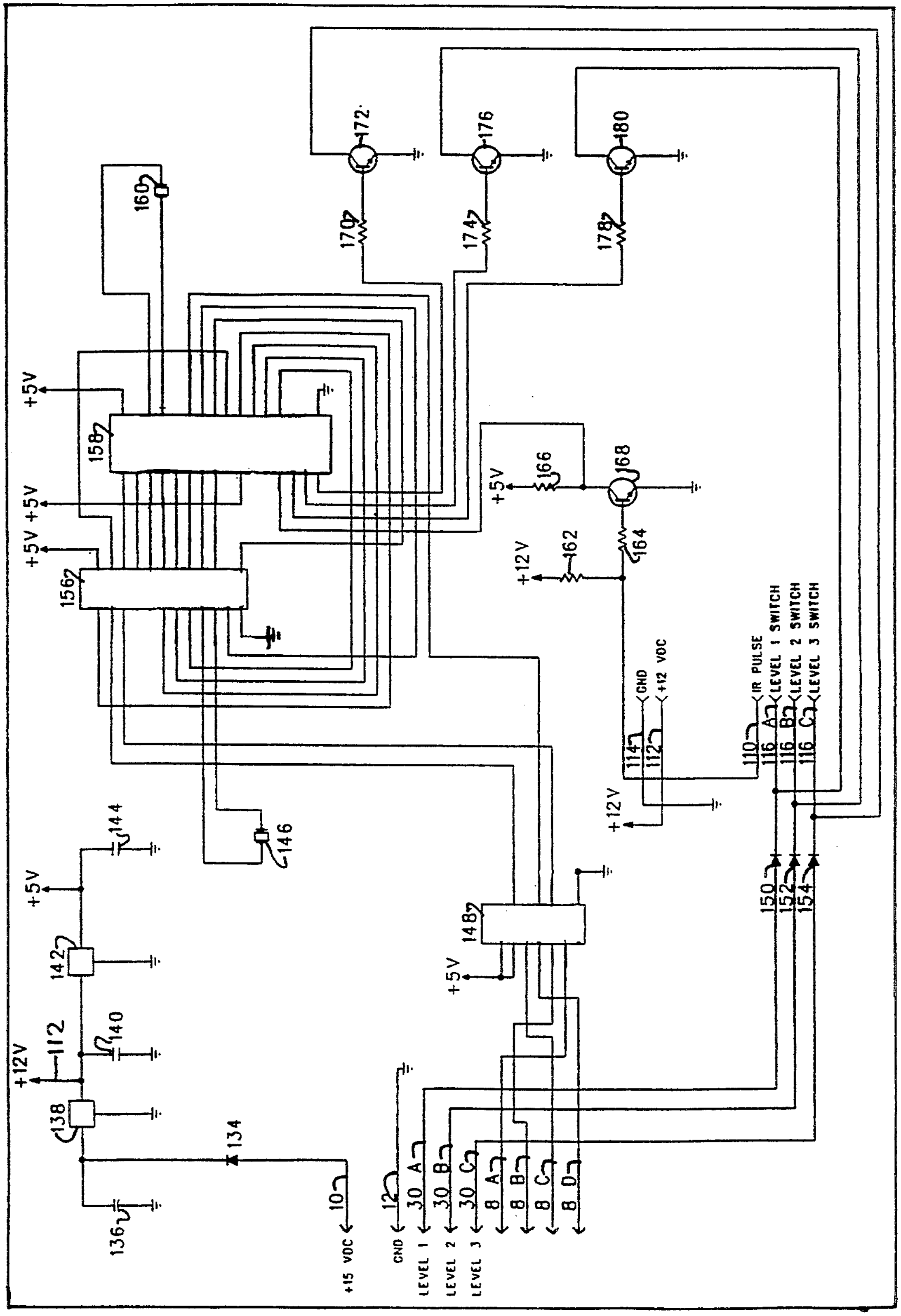
FIG. 9 is a schematic illustration of the circuitry for the intelligent locator receiver forming part of the systems of FIGS. 1 and 2.

In FIGS. 7, 8 and 9 schematically illustrated is the circuitry of an intelligent locator receiver which is useful in the embodiments of the systems shown in FIGS. 1 and 2. Turning first to FIG. 7, there is illustrated by the block diagram two circuit boards, one of which is a preamp board 106, and the other a logic board 108 which are mounted to a single gang face plate for installation in a wall or in a ceiling of a room within the premises of a facility where the system of the present invention operates. Preamp board 106 is mounted directly to the face plate and logic board 108 forms the back board mounted behind the preamp board in a piggy-back fashion. Preamp board 106 includes Pin photodiode 118 for detecting by impingement infrared pulses 104 emitted by an intelligent locator transmitter 18. Three light emitting diodes 120, 122 and 124 emit different colors of light to give a visual indication on the receiver face plate of three possible levels of persons such as nurses, e.g. RN, LPN and aid whose presence is detected by the system. The logic board supplies power to the preamp board for the operation thereof including illumination of the light emitting diodes 120, 122 and 124 in response to signals received in a three wire bus line 116 from the logic board. The logic board decodes pulses output from the preamp board in line 110 to validate a code and communicate a validation of the code by data transmission to intelligent locator arbitrator 6. It will be understood that the system of FIG. 2 provides that the arbitrator 6 forwards data to the receiver 16 that includes information in the form of a signal indicative of the level of the nurse detected by the intelligent locator receiver which has been recorded thereby.

FIG. 8 shows the greater details of the preamp board 106 wherein it can be seen that there is included an infrared preamplifier 126 having input terminals coupled to PIN photodiode 118 and an input terminal coupled to receive a +12 VDC power supply by line 112. A common ground potential is also presented by line 114. Infrared pulses impinging on diode 118 cause a forward biasing thereof causing a pulse input of current to the preamplifier 126 which converts the current pulse whose duration is 10 microsecond to a 12 volt logic pulse of approximately 50 to 300 microseconds in duration. The pulse width is directly proportionate to the intensity of the detected infrared light pulse and is communicated to the logic board by line 110. The diode 120 designed to emit green light is coupled through a current limiting resistor 128 to indicate by designation a nurse level presence of "1" by the occurrence of a low voltage level in line 116A received from the logic board 108. The diode 122 designed to emit yellow light is coupled through a current limiting resistor 130 to indicate by designation a nurse level presence of "2" by the occurrence of a low voltage level in line 116B received from the logic board 108. The diode 124 designed to emit red light is coupled through a current limiting resistor 132 to indicate by designation a nurse level presence of "3" by the occurrence of a low voltage level by line 116C supplied by the logic board 108.

FIG. 9 shows greater details of the logic board 108 wherein the circuitry includes a voltage protection diode 134 in the +15 VDC input 10 and a filter capacitor 136 that is parallel with a 12 voltage regulator 138 whose output is a 12 VDC power supply filtered by capacitor 140 for delivery to preamp board 106 by line 112. The preamp board 106 is coupled to ground potential by ground line 114. The +12 VDC output from voltage regulator 138 is also coupled to form an input to a voltage regulator 142 whose output is a +5 VDC filtered by capacitor 144 for powering 5 volt logic devices on the logic board that include microcontroller 158, a universal asynchronous receiver transmitter hereinafter identified as uart 156, and a RS-485 serial data transceiver 148. The +12 VDC logic pulses occurring as outputs from preamplifier 126 in line 110 are input to a voltage level conversion circuit that includes voltage level resistors 162 and 164, the latter coupled to the gate of transistor 168 which outputs through resistor 166 +5 VDC pulses to the microcontroller 158. The microcontroller 158 samples the input bursts to establish the validity of an identification code. The validation is made when the identification code consists of, as shown in FIG. 4, a start pulse 46 followed by 10 pulses 48 representing a 20 bit code, followed by three pulses 50 representing a 6 bit checksum.

For this purpose, the microcontroller 158 includes an operating program to perform an important and believed novel feature of the present invention of causing operation of the microcontroller to recalculate a checksum by using bursts from the received identification code and then comparing the freshly calculated checksum with the checksum received with the identification code. When the freshly calculated checksum equals the checksum received with the identification code, the code is established as valid. When the comparison shows an inequality of the compared checksums then the code bursts pulses transmission is ignored. In this way, if too few code burst pulses or too many code burst pulses (as in the case of overlapping pulse transmissions) are detected then those transmissions are also ignored.

When the operation of microcontroller 158 establishes the validity of a received identification code then the microcontroller outputs a signal corresponding to the validated code to the intelligent locator arbitrator $6_1, 6_2 - - - 6_{32}$ by way of the RS-485 serial data bus 8. An operating clock for the microcontroller 158 is formed by a quartz crystal 160. In the system shown in FIG. 2, the arbitrators $6_1, 6_2 - - - 6_{32}$ return the nurse level information corresponding to that received identification code to the microcontroller 158 of the receiver. This nurse level information is then transmitted to the patient station 32 by the three lines 30A, 30B and 30C which incorporate protection diodes 150, 152 and 154. The microcontroller 158 outputs signals through base resistors 170, 174 and 178 coupled through transistors 172, 176 and 180 respectively, to lines 116A, 116B and 116C to energize the respective light emitting diodes located on the intelligent locator receiver preamp board 106. The microcontroller 158 also communicates with arbitrator 6 by the RS-485 databus 8. As can be seen from FIG. 9, microcontroller 158 responsive to an operating clock formed by quartz crystal 160 communicates through the uart 156 and the RS-485 interface integrated circuit 148 with arbitrator 6 over data lines 8A, 8B, 8C and 8D collectively forming data bus 8. The uart 156 is an integrated circuit whose function is to convert parallel data received from microcontroller 158 to serial data and output the serial data at a selected baud rate to the RS-485 interface integrated circuit 148. The uart 156 also receives serial data at a selected baud rate from the integrated circuit 148 and performs a conversion to parallel data which is read as an input to microcontroller 158. The uart 156 derives its operating clock from a quartz crystal 146. The RS-485 interface IC 148 delivers serial data output by the uart 156 to differential outputs 8A and 8B to be transmitted over a twisted wire pair. Also, the RS-485 interface IC 148 converts differential inputs in lines 8C and 8D from a twisted pair line to serial data inputs which can be read by the uart 156.

INTELLIGENT LOCATOR ARBITRATOR 6

Figure 10:
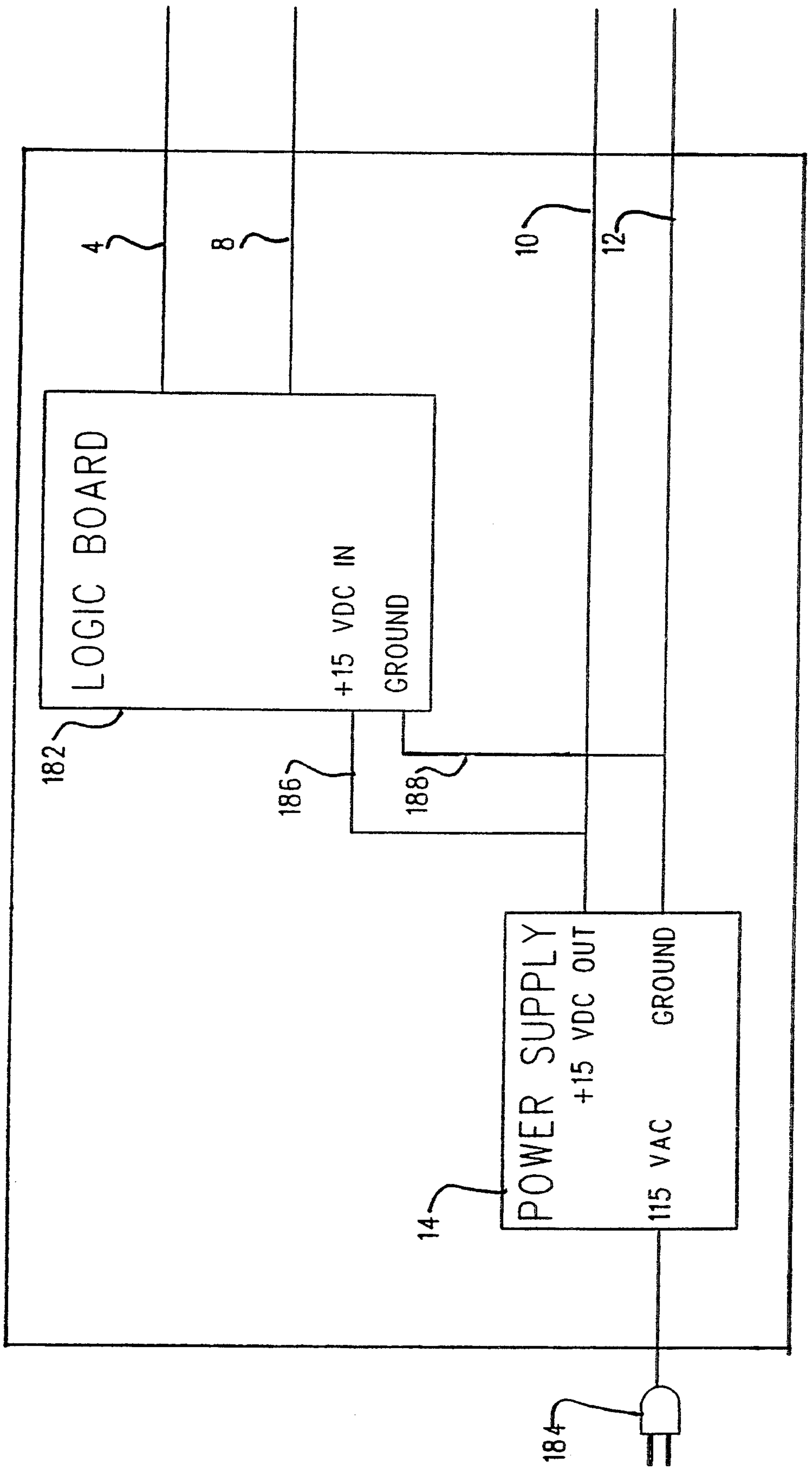
FIG. 10 is a block diagram of the intelligent locator arbitrator forming part of the systems of FIGS. 1 and 2.

In FIG. 10 schematically illustrated is a block diagram of the circuitry of the intelligent locator arbitrator 6 useful in the systems of FIGS. 1 and 2. The arbitrator includes a logic circuit board 182 and a +15 VDC power supply 14. Power supply 14, per se well known in the art, chosen from any one of a variety of commercially available units to deliver about 3 amps at 15 volts DC through a rectifier circuit coupled by line 184 to a standard 115 VAC line. Power supply 14 outputs +15 VDC in line 10 having a branch line 186 coupled to the logic board 182. Similarly, line 12 at ground potential also emerging from the power supply has a branch line 188 coupled to establish ground potential for the logic board 182.

Figure 11:
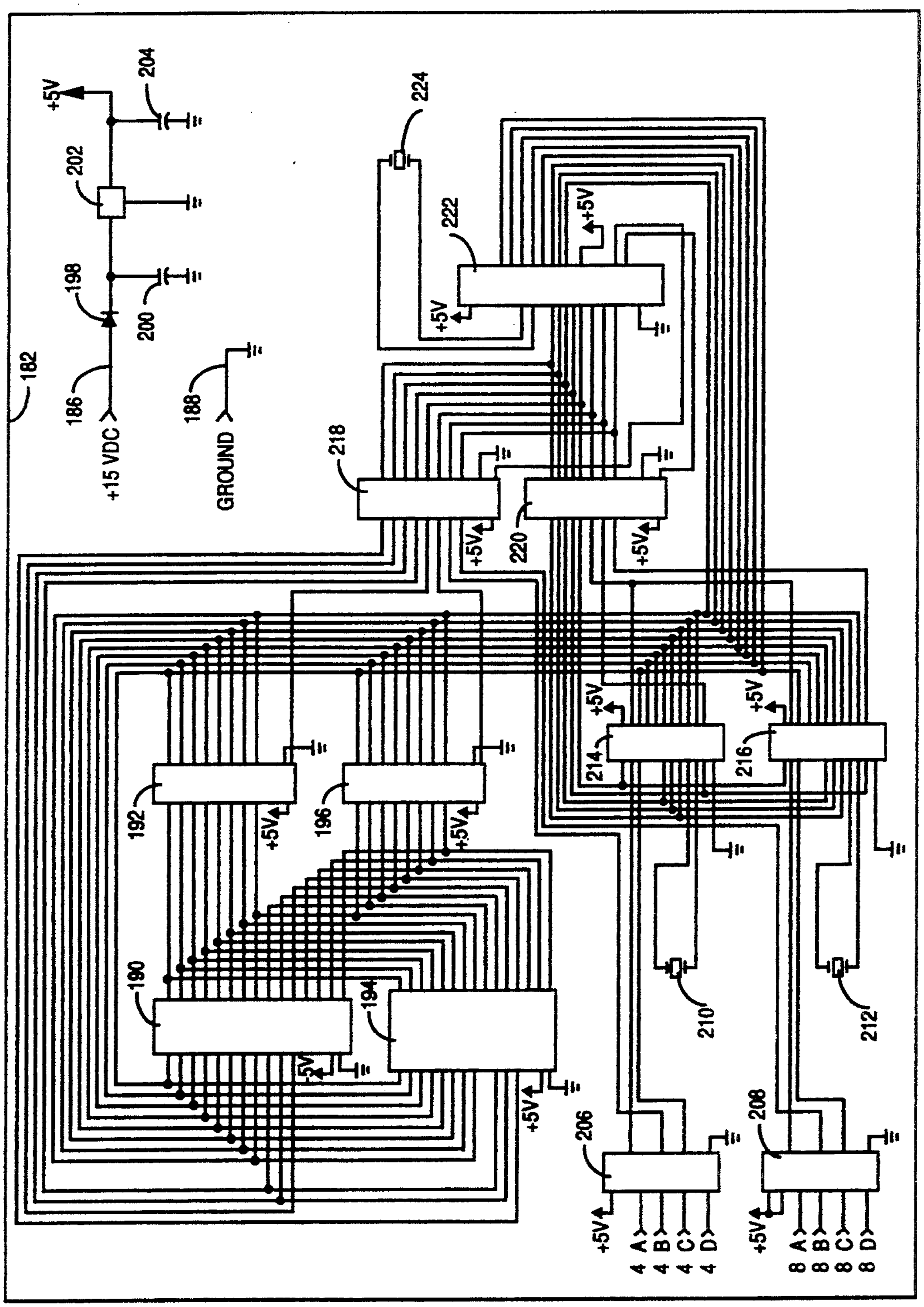
FIG. 11 is a schematic illustration of the circuitry forming part of the intelligent locator arbitrator forming part of the systems of FIGS. 1 and 2.

Referring now to FIG. 11, the details of the circuitry forming the intelligent locator arbitrator circuit board 182 is illustrated wherein it can be seen that the +15 VDC input 186 is protected by diode 198 followed by a grounded filter capacitor 200. Beyond the capacitor 200 in the circuit is a regulator 202 whose output is at a potential of +5 VDC filtered by grounded capacitor 204 for supplying power to all of the devices that include microcontroller 222, universal asynchronous receiver transmitters 214 and 216, hereinafter referred to as uart 214 and 216, RS-485 serial data transceivers 206 and 208, signal control latches 218 and 220, the static rams 190 and 194 and the ram address latches 192 and 196.

As shown the microcontroller 222 communicates with the intelligent locator computer 2 by the RS-485 serial data bus 4 through uart 214 and the RS-485 interface integrated circuit 206. Additionally, the microcontroller 222 communicates with the intelligent locator receiver 16 by the RS-485 type serial data bus 8 through uart 216 and the RS-485 interface integrated circuit 208. The uarts 214 and 216 take the form of integrated circuits which receive parallel data from the microcontroller 222, convert the parallel data to serial data and output the serial data at a selected baud rate to the RS-485 interface integrated circuits 206 and 208. The uarts 214 and 216 also receive serial data at a selected baud rate from the RS-485 interface integrated circuits 206 and 208 and convert the serial data to parallel data read in by the microcontroller 222. Quartz crystals 210 and 212 form operating clocks for the uarts 214 and 216, respectively. The RS-485 interface integrated circuits 206 and 208 convert serial data outputs from the uarts 214 and 216, respectively, to differential outputs in lines 4A and 4B extending to the intelligent locator computer 2 with respect to IC 206 and lines 8A and 8B extending to the intelligent locator receivers 16 for transmission by way of twisted pair wire. The RS-485 interface integrated circuit 206 converts differential inputs received from twisted pair wires 4C and 4D from the intelligent locator computer to serial data inputs read by uart 214. The RS-485 interface integrated circuit 208 converts differential inputs received from twisted pair wires 8C and 8D from the intelligent locator receivers 16 to serial data inputs read by uart 216. The microcontroller 222 latches all its external control signals to the other integrated circuits on the intelligent locator arbitrators logic board 182 in two 8 bit latch integrated circuits 218 and 220. This enables the microcontroller 222 to expand its 8 bit data output port to drive 16 control signals. The microcontroller 222 also latches the address bus of the static rams 190 and 194 in two 8 bit latch integrated circuits 192 and 196. This enable the micro-controller to multiplex its 8 bit data bus with the 15 bit address bus of the static rams 190 and 194. Quartz crystal 224 forms an operating clock for the microcontroller 222.

Each arbitrator 6 is connected by an RS-485 serial bus 8 to process signals from a maximum of preferably 32 intelligent locator receivers 16. Each arbitrator 6 operates to establish the event when a transmitter 18 is first detected by a receiver 16 and the event when a transmitter 18 is no longer detected by a receiver 16 and transmits such start and stop events as signals to the intelligent locator computer 2. The microcontroller 222 in each arbitrator 6 through operation of a resident program reads the identification codes reported by each intelligent locator receiver 16 by way of RS-485 serial bus 8. If an identification code transmitter 18 has been carried into the detection range of a receiver 16, the microcontroller 222 sends a start event message containing the identification code and an identification number of that receiver 16 to the computer 2 by the RS-485 bus 4. The microcontroller 222 also stores that identification code in a static ram 190 and 194 in a table of information for that particular receiver 16. As long as the receiver 16 continues to report that identification code, the identification code remains in the static ram 190 and 194. However, when the intelligent locator stops a reporting of the identification code for more than 10 seconds, the microcontroller 222 sends a stop event message to the computer 2 and removes that identification code from the static ram 190 and 194 for that intelligent locator receiver 16. In the particular embodiment of the system shown in FIG. 2, the microcontroller 222 also receives and stores in ram 190 and 194 a table of nurse level information from the intelligent locator computer 2.

The table of nurse level information includes a list of identification codes of the badges worn by nurses and the nurse level of each such person e.g., RN, LPN or aid. When an intelligent locator receiver 16 reports an identification code which corresponds to one of the nurse codes, the microcontroller 222 sends that nurse level information to that intelligent locator receiver 16 by the associated RS-485 serial bus 8. In this way, the receiver 16 is supplied with a signal to turn ON one of the nurse level light emitting diodes 120, 122 or 124 and at the same time to deliver a signal to the patient station 32 indicating the presence of a nurse and to which of the three levels the nurse belongs.

INTELLIGENT LOCATOR COMPUTER

Figure 12:
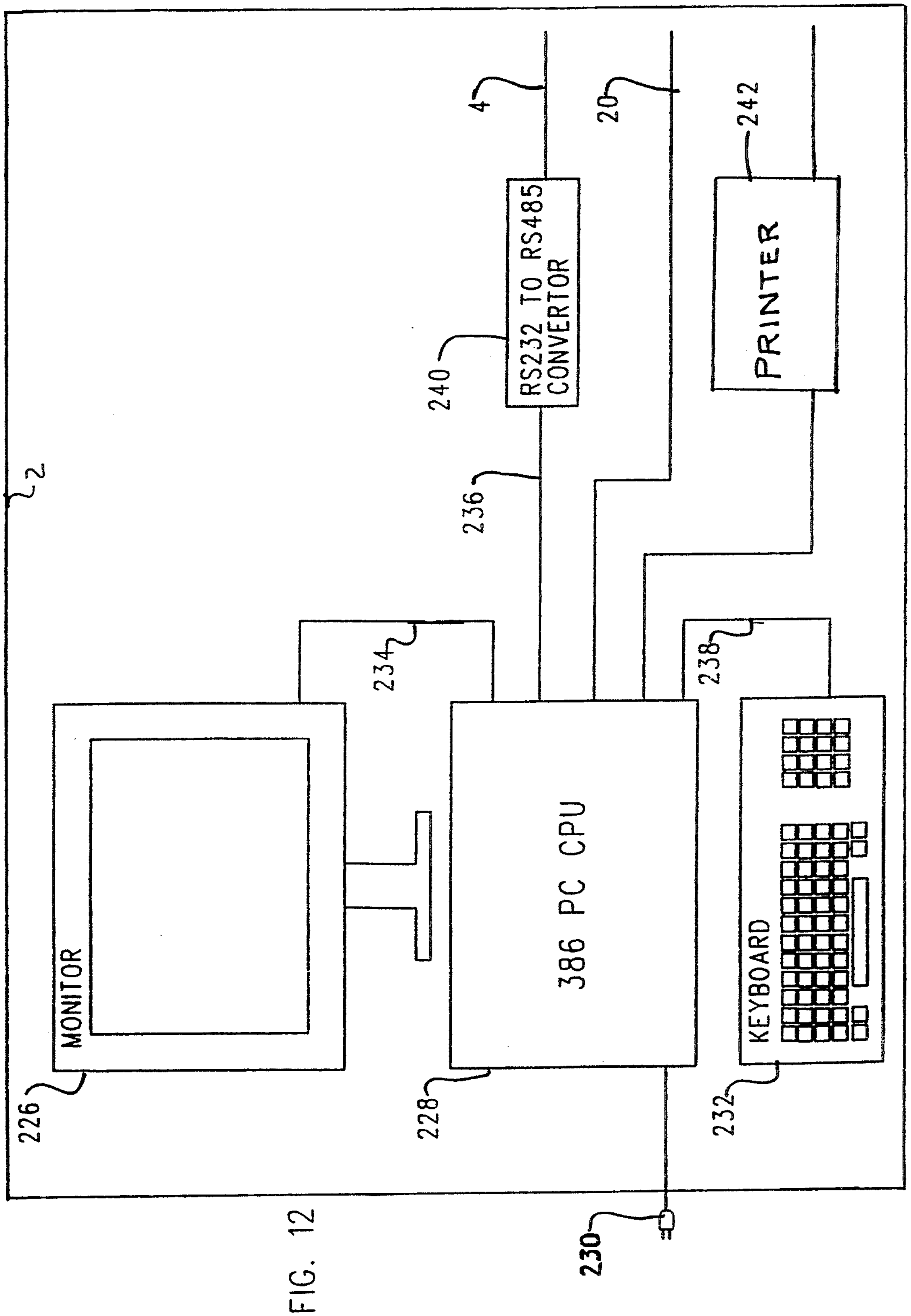
FIG. 12 is a block diagram illustrating the intelligent locator computer forming part of the system of FIGS. 1 and 2.

In FIG. 12 schematically illustrated is a block diagram of the intelligent locator computer 2 useful in the systems of FIGS. 1 and 2. The computer 2 contains an intel 386 personal computer central processing unit 228, a monitor 226 for viewing data, a keyboard 232 for entering the data, an RS-232 to RS-485 converter box 240, a terminal for the ethernet bus 20 and a printer 242 coupled by an interface to the CPU 228. The CPU 228 also includes its own power supply which includes a line 230 for receiving 115 VAC. The PC CPU 228 controls the monitor 226 through an interface cable 234. An interface cable 238 interfaces the keyboard 232 with the CPU 228. The converter box 240 is used to convert standard RS-232 data from a serial port 236 of the CPU to the RS-485 data bus 4. Operating software in the CPU 228 receives start and stop events from the arbitrators 6, time stamps these events and stores the events in a data base. The start event includes an identifying number of the intelligent locator receiver 16, the identification code of the transmitter 18 within the range of the receiver 16 and the real time of the occurrence of the start event.

The stop event includes the identifying number of the receiver 16, the identification code of the transmitter 18 removed from the reception area of the receiver 16 and the real time of the occurrence of the stop event. The computer 2 has a front end interface to enable an operator to request the location of that person or object wearing a transmitter 18. In the embodiment of FIG. 2, CPU 228 has an ethernet interface for interfacing with the nurse call CPU 26. The ethernet interface can also be used to attach a terminal server to allow the capability of multiple terminals for use throughout the facility where operators can request location information about any transmitter 18. The CPU is equipped with necessary means including software for generating reports detailing previous movement of any transmitter over a period of time which can be generated and viewed at the terminal or reduced to hard copy by the printer 242.

Figure 13:
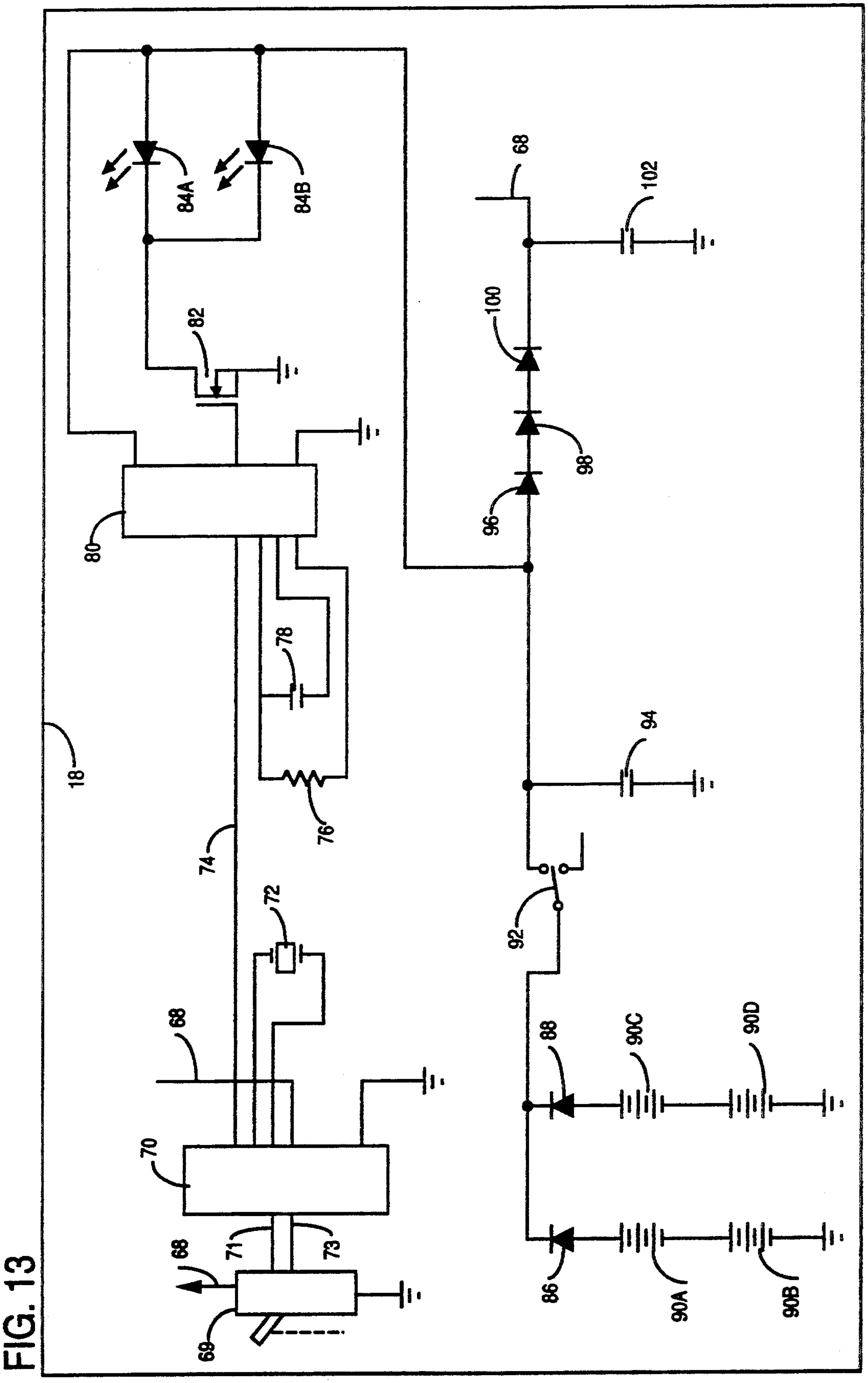
FIG. 13 is a schematic illustration similar to FIG. 6 and of a modified form of the circuitry of the intelligent location transmitter that can be used in the systems of FIGS. 1 and 2.

In FIG. 13 schematically illustrated is another embodiment of the transmitter 18 wherein like reference numerals identify the same parts identified and described hereinbefore in regard to FIG. 6. In FIG. 13, a four position logic switch 69 is included which is connected to inputs 71 and 73 of microcontroller 70 and sets a two bit code on inputs 71 and 73 of microcontroller 70. The operating program of the microcontroller 70 reads this two bit code on its inputs 71 and 73, and incorporates that two bit code in its 20-bit identification code for transmission. This additional two bit code forms data, which is changeable in the field via the switch 69, is useful in the system of FIG. 2 to differentiate the three levels of nurse (RN, LPN, aid) from other identification badges. In this embodiment, the receivers 16 determine nurse level information directly from the received pulse bursts and pass that information to the patient station 32 without have to wait for the arbitrator 6 to look up that level information in a table and communicate that information back to the receiver 16.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. A locating and monitoring system installable on the premises of a facility, said system including:

a plurality of transmitter means adapted for movement about said facility with a person, with an animal or with equipment to allow identification of such transmitter means at any of diverse sites in the facility, each of said transmitter means including means for transmitting infrared pulse bursts, each of said infrared pulse bursts defining a unique binary identification code comprising a plurality of binary bits of sufficient number that each of said transmitter means in said facility transmits a different binary identification code, means responsive to an algorithm for controlling said means for transmitting said infrared pulse bursts during a predetermined time interval, with the occurrence of each pulse burst in time relative to the start of each time interval varying from time interval to time interval, the amount of said varying being controlled by said means responsive to an algorithm incorporated in each transmitter using said unique binary identification code of that transmitter for preventing synchronization with other transmitters and with ambient periodic resident signals in the facility, and wherein said transmitter means transmits said pulse bursts, each pulse of said burst representing at least two binary bits in a pulse position scheme of the identification code data for reducing the number of pulses required to represent said unique binary identification code and therefore minimize power consumption by said transmitter means;

receiver means responsive to said pulse bursts by said plurality of transmitter means at each of said diverse sites in said facility for detecting infrared pulse bursts by said transmitter means; and central means responsive to said receiver means for establishing the location of said transmitter means in said facility.

2. The system of claim 1 wherein said pulse bursts include an error detection code to insure integrity of pulse bursts transmission using a pulse position scheme to represent at least two binary bits with one pulse, and wherein said means responsive to said pulse bursts includes means for recalculating an error detection code using the received binary identification code and comparing the recalculated error detection code to the received error detection code for validation of the binary identification code.

3. The system of claim 2 wherein said error detection code includes a binary checksum which comprises the binary sum of all of the digits of the said binary identification code.

4. A portable communication unit comprising a portable infrared transmitter means including a portable power supply adapted for movement about the premises of a facility with a person, with an animal or with equipment to allow identification of such transmitter means at any of diverse sites in the facility, said portable infrared transmitter means including infrared emitter means controlled by controller means responsive to an algorithm unique to and with that transmitter means for producing infrared pulse bursts at diverse times during predetermined time intervals, said pulse bursts defining a unique binary identification code according to a pulse position scheme to represent at least two binary bits of the identification code data with each pulse of a plurality of pulses for reducing the number of pulses required to represent said unique binary identification code and thereby reduce consumption of power of said portable power supply.

5. The portable communication unit of claim 4 wherein said pulse bursts include an error detection code to insure integrity of transmissions of said pulse bursts.

6. The portable communication unit of claim 5 wherein said error detection code includes a binary checksum which comprises the binary sum of all of the digits of the said binary identification code.

7. The portable communication unit of claim 4 wherein said means for transmitting pulse bursts includes a microcontroller having memory containing said unique binary identification code.

8. The portable communication unit of claim 7 wherein said microcontroller includes microcode to calculate a checksum of said binary identification code and generates said pulse bursts which include a start bit, said binary identification code, and said checksum.

9. The portable communication unit of claim 4 wherein said identification code comprises at least 20 binary bits to provide at least 1,048,576 different identification codes.

10. The portable communication unit of claim 4 wherein each pulse burst is of about 20 milliseconds in duration.

11. The portable communication unit of claim 4 wherein said pulse bursts each occur once in the predetermined time interval of about one second.

12. The portable communication unit of claim 4 wherein each pulse of said pulse bursts is transmitted by a 10 microsecond flash of infrared light.

13. The system of claim 4 for tracking the movements of hospital personnel and allied hospital equipment, and interfacing to an existing nurse call hospital system by providing: that each of said plurality of said transmitter means comprises a portable communication badge worn by allied hospital personnel, including nurses, and attached to said hospital equipment; said means for establishing the location including a receiver installed in each patient room to interface with said nurse call hospital system; a receiver installed in each patient room for indicating when said allied hospital personnel wearing one of the said badges enters the room, and the class of a number of classes to which the allied hospital personnel belongs; and an interface between said central computer and said nurse call hospital system such that location queries entered at terminals of said hospital system are routed to said central computer.

* * * * *